United States Patent [19]

Faulk

[11] Patent Number: 5,680,036
[45] Date of Patent: Oct. 21, 1997

[54] LOGARITHMIC POWER COMPENSATION FOR A SWITCHING POWER SUPPLY

[75] Inventor: Richard A. Faulk, Cypress, Tex.

[73] Assignee: Compaq Computer Corporation, Houston, Tex.

[21] Appl. No.: 617,597

[22] Filed: Mar. 19, 1996

[51] Int. Cl.[6] .................................................. G05F 1/56
[52] U.S. Cl. .................................... 323/282; 363/21
[58] Field of Search .............................. 323/282, 285, 323/286; 363/21, 17

[56] References Cited

U.S. PATENT DOCUMENTS

| | | | |
|---|---|---|---|
| 4,616,300 | 10/1986 | Santelmann | 363/21 |
| 4,672,518 | 6/1987 | Murdock | 363/21 |
| 4,866,588 | 9/1989 | Rene | 363/21 |

*Primary Examiner*—Stuart N. Hecker
*Assistant Examiner*—Rajnikant B. Patel
*Attorney, Agent, or Firm*—Pravel, Hewitt, Kimball & Krieger

[57] ABSTRACT

A current-mode control system for a switching power supply which provides logarithmic compensation to a peak primary current of a variable frequency, fully discontinuous switching power supply. A ramp voltage generator generates a ramp voltage that is furnished to a control circuit. The control circuit compares the voltage level of the ramp signal to the voltage level of a control voltage. The control voltage is provided by an error amplifier and is a function of an output voltage of the converter. The control circuit allows a primary switching current to exist in the converter until the ramp voltage renders the control voltage. The ramp voltage logarithmically compensates the peak of the primary current by adjusting the ramp voltage. This logarithmic compensation provides a relatively constant output power over a large input voltage range.

15 Claims, 7 Drawing Sheets

LOGARITHMIC POWER COMPENSATION FOR A SWITCHING POWER SUPPLY

BACKGROUND OF THE INVENTION

1. Field of the Invention

The present invention relates to the control of switching power supplies and more particularly to a control system for providing constant output power regulation in variable frequency flyback counters over a wide input voltage range.

2. DESCRIPTION OF THE RELATED ART

Due to their compact size and efficiency, switching power supplies have been very desirable for supplying power to electronic equipment, such as laptop computers. A switching power supply known for its low number of components and low cost has been a flyback converter. In the flyback converter circuit, conventional alternating current voltage was rectified and filtered to produce an unregulated direct current input voltage. The unregulated direct current input voltage was then provided to an input circuit which included a primary winding of a power transformer.

The flyback converter further included an output circuit which included a secondary winding of the power transformer. The output circuit developed appropriate direct current output voltage levels for the electronic equipment. A control system then regulated the output voltage of the power supply by constantly switching current, through the use of a primary switch in the input circuit and a rectifier in the output circuit, in order to transfer power to the output circuit. The primary switch was typically a metal-oxide-semiconductor field-effect-transistor (MOSFET).

In order to regulate an output voltage of the flyback converter within a specific tolerance band, the control system has typically employed negative feedback control. One type of feedback control has been commonly referred to as current-mode control, wherein the control system monitored both a switched current of the converter and the output voltage of the converter. The control system then directly adjusted the monitored switched current in order to obtain a desired output power.

It was often desirable to operate the converter in a fully discontinuous mode of operation. In the fully discontinuous mode of operation, no current is flowing in the converter during certain time intervals of operation. For a constant frequency flyback converter operating in the discontinuous mode, the output power of the flyback converter was ideally a function of the square of the peak magnitude of a primary current of the converter.

The above-described approximation was improved by accounting for parasitic effects which caused a variation in the output power even though the peak of the primary current was held constant. It was determined that non-ideal variations in the output power of the converter varied proportionately with the input voltage of the converter. The control system linearly compensated the peak of the primary current for corresponding changes in the input voltage, and the output power of the converter remained constant.

In the above-described constant frequency flyback converter operating in the fully discontinuous mode, the time intervals during which no currents existed in the converter, known as "dead time," reduced the efficiency of the flyback converter, as no power was being transferred during these time intervals. An alternative to eliminating this dead time was to operate the flyback converter in a variable frequency, critically discontinuous mode of operation. In this mode of operation, the switched currents in the converter decreased to zero; however, the switched currents immediately increased thereafter which eliminated the dead time.

The problem encountered with the variable frequency, critically discontinuous mode of operation was keeping the output power of the flyback converter constant. The output power of the flyback converter could no longer be controlled by linearly varying the peak of the primary current with corresponding changes in the input voltage. Additional complex control circuitry which consumed extra board space was used to maintain constant power regulation.

SUMMARY OF THE PRESENT INVENTION

Briefly, the present invention relates to a new and improved control system for a switching power supply or converter which provides logarithmic compensation for an output power of the converter for changes in an input voltage. The present invention maintains a relatively constant output power for the converter while compensating for a wide range of input voltages and output loads.

In the preferred embodiment, the present invention provides current-mode control for controlling a variable frequency, critically discontinuous, flyback converter. The control system adjusts the peak magnitude of a primary current of the converter in order to regulate the output power of the converter. The primary current induces a voltage signal in an auxiliary winding, and the voltage signal appearing across the auxiliary winding is provided to a ramp generator circuit. The ramp generator circuit furnishes a ramp signal to a control circuit which switches a primary switch of the converter when the peak magnitude of the ramp signal reaches a control voltage. The control voltage is provided by an error amplifier and is a function of input voltage and power and output voltage of the converter.

The primary switch controls a primary current of the converter. The ramp voltage is logarithmically compensated by the ramp generator circuit so that the peak magnitude of the primary current varies logarithmically with the input voltage of the converter. This allows the converter to maintain a relatively constant output power over a large input voltage range.

The control system for the flyback converter consumes very little board space while providing constant output power regulation for the efficient variable frequency, critically discontinuous converter.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

1. Prior Art Design Considerations

Figure 1:
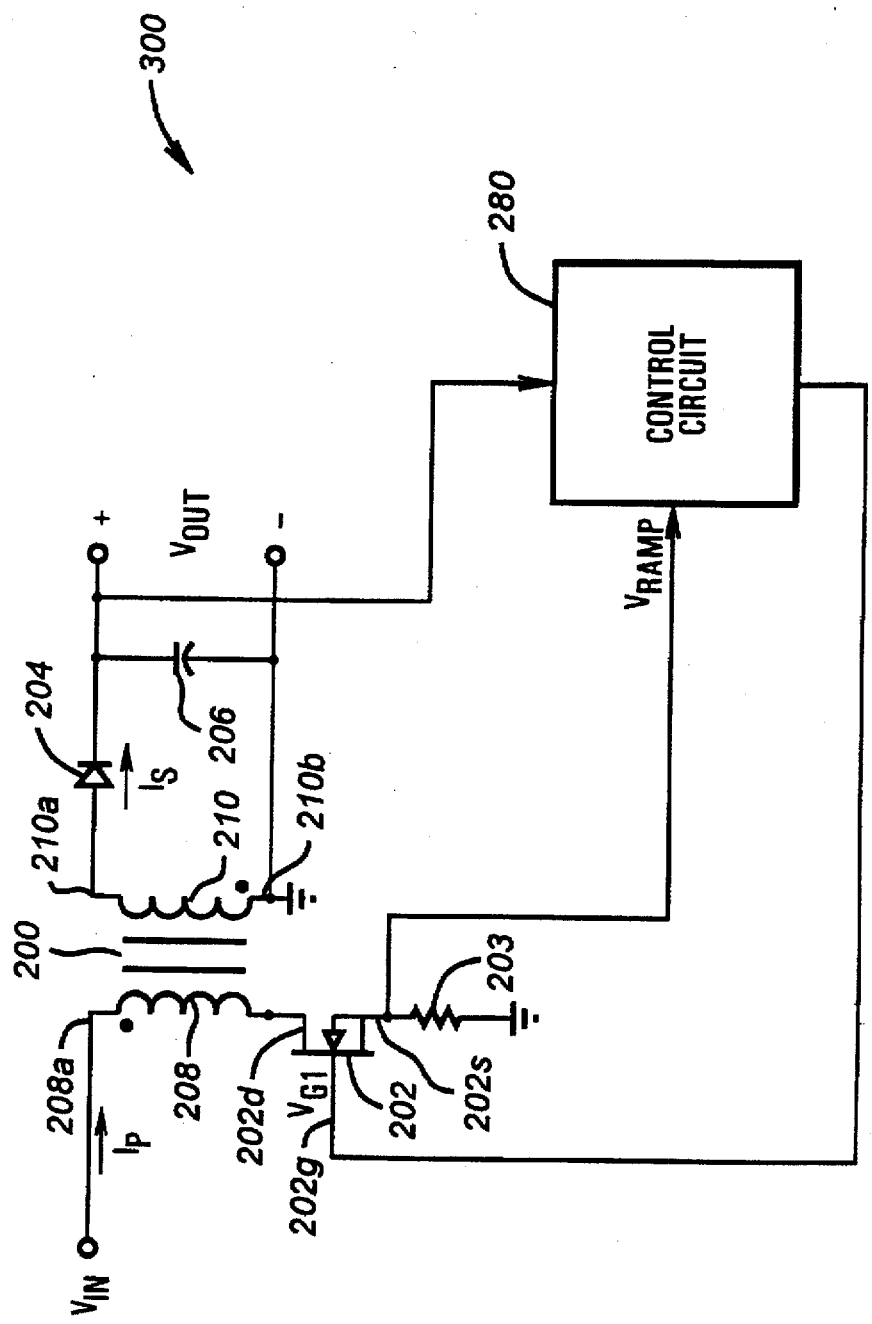
FIG. 1 is a schematic diagram illustrating a fully discontinuous flyback converter using a control system of the prior art.

In order to more clearly understand the present invention, a review of prior art power compensation is presented. FIG. 1 is a schematic diagram used to illustrate operation and problems of flyback control systems of the prior art with the waveforms illustrated in FIGS. 3A, 3B, 3C, and 3D. A constant frequency, fully discontinuous flyback converter 300 having a control system of the prior art has a power transformer 200 having a primary winding 208 and a secondary winding 210.

The primary winding 208 of the transformer 200 is connected to an input power source which provides an input voltage $V_{IN}$. The input voltage $V_{IN}$ is provided to one terminal 208a of the primary winding 208, and the other terminal of the primary winding 208 is connected to a drain terminal 202d of a transistor 202. The transistor 202 is an N-channel, enhancement type, metal-oxide-semiconductor field-effect-transistor (MOSFET). However, the transistor 202 could be replaced by various types of transistors, switches and switching circuits as can be appreciated by those skilled in the art.

A source terminal 202s of the transistor 202 is connected to one end of a resistor 203 which has its other end connected to a primary side ground. A gate terminal 202g of the transistor 202 is connected to a control signal $V_{G1}$ formed in and provided by a control circuit 280. An example waveform of control signal $V_{G1}$ is shown in FIGS. 3A, 3B, 3C, and 3D. The $V_{G1}$ signal is a pulse train signal with a fixed frequency. The duty cycle of the $V_{G1}$ signal is used to control an output power P of the converter 300.

The $V_{G1}$ signal is asserted at time $T_o$, and the transistor 202 conducts. The $V_{G1}$ signal is negated at time $T_1$, and the transistor 202 no longer conducts. The transistor 202 functions as an on-off switch which switches a primary current $I_P$ flowing through the primary winding 208 of transformer. As shown in FIG. 3, the magnitude of the primary current $I_P$ increases in a linear fashion from time $T_0$ to time $T_1$ when transistor 202 is no longer conducting. When transistor 202 is not conducting, $I_P$ is negated.

The secondary winding 210 of transformer 200 also forms part of the flyback converter 300. The secondary winding 210 has one terminal 210a with a polarity opposite of the terminal 202d connected to secondary side ground, and another terminal 210b of secondary winding 210 is connected to the anode of a diode 204. The cathode of the diode 204 is connected to one end of a capacitor 206 which in turn is connected to secondary side ground. The diode 204 and the capacitor 206 rectify and filter the AC voltage from the secondary winding 210 to provide a signal across capacitor 206 which is the DC output voltage of flyback converter 300 $V_{OUT}$.

As discussed in more detail below, during the time the transistor 202 is conducting current, energy is transferred from the input power source to the electromagnetic field of the transformer 200. When the transistor 202 is not conducting current, a secondary current $I_s$ flows in the secondary winding 210 and transfers the stored energy from the electromagnetic field of the transformer 200 to the capacitor 206.

The flyback converter 300 also has a conventional control circuit 280 which receives a $V_{RAMP}$ signal which is indicative of the primary current $I_P$. The $V_{RAMP}$ signal is the voltage across the resistor 203.

The control circuit 280, by using current-mode control techniques further discussed below, achieves a constant output power $P_{300}$ for the converter 300 by monitoring $V_{OUT}$ and the peak amplitude of $V_{RAMP}$. For the constant frequency, fully discontinuous mode of operation, an output power $P_{300}$ of the converter 300 is a function of the input voltage $V_{IN}$ and the peak magnitude of the primary current $I_P$, represented by $I_{P\_PK}$. By linearly adjusting the peak of the primary current $I_{P\_PK}$ for corresponding changes in the input voltage $V_{IN}$, a relatively constant output power $P_{300}$ can be obtained.

Now referring to FIGS. 3A, 3B, 3C, and 3D to illustrate operation of the flyback converter 300, at time $T_0$, the $V_{G1}$ signal is asserted, and the transistor 202 begins to conduct current. Thus, the input voltage $V_{IN}$ is effectively coupled across the primary winding 208 from time $T_0$ to time $T_1$. As shown in FIGS. 3A, 3B, 3C, and 3D the primary current $I_P$ increases in a linear fashion from time $T_0$ to time $T_1$. During this time, there is no secondary current $I_s$ because the polarity of secondary winding 210 keeps diode 204 from conducting. Additionally, during the time interval from time $T_0$ to time $T_1$, the $V_{RAMP}$ signal increases in a linear fashion until the $V_{RAMP}$ signal reaches a control voltage $V_c$ at time $T_1$.

During the time interval from time $T_1$ to time $T_2$, the control circuit 280 negates $V_{G1}$, and the transistor 202 does not conduct. At time $T_1$, the polarity of the secondary winding 210 is reversed which allows the secondary current $I_s$ to flow in the diode 204. The secondary current $I_s$ stops flowing at time $T_2$. Thus, as shown in FIGS. 3A, 3B, 3C, and 3D at time $T_1$, $I_s$ decreases in a linear fashion which transfers energy stored in the electromagnetic field of the transformer 200 from time $T_0$ to time $T_1$. $I_s$ decreases in a linear fashion from time $T_1$ to time $T_2$. From time $T_2$ to time $T_3$, no energy is being transferred through the converter 300. This is known as "dead time" for the converter 300 which significantly degrades the efficiency of the converter 300.

Figure 2:
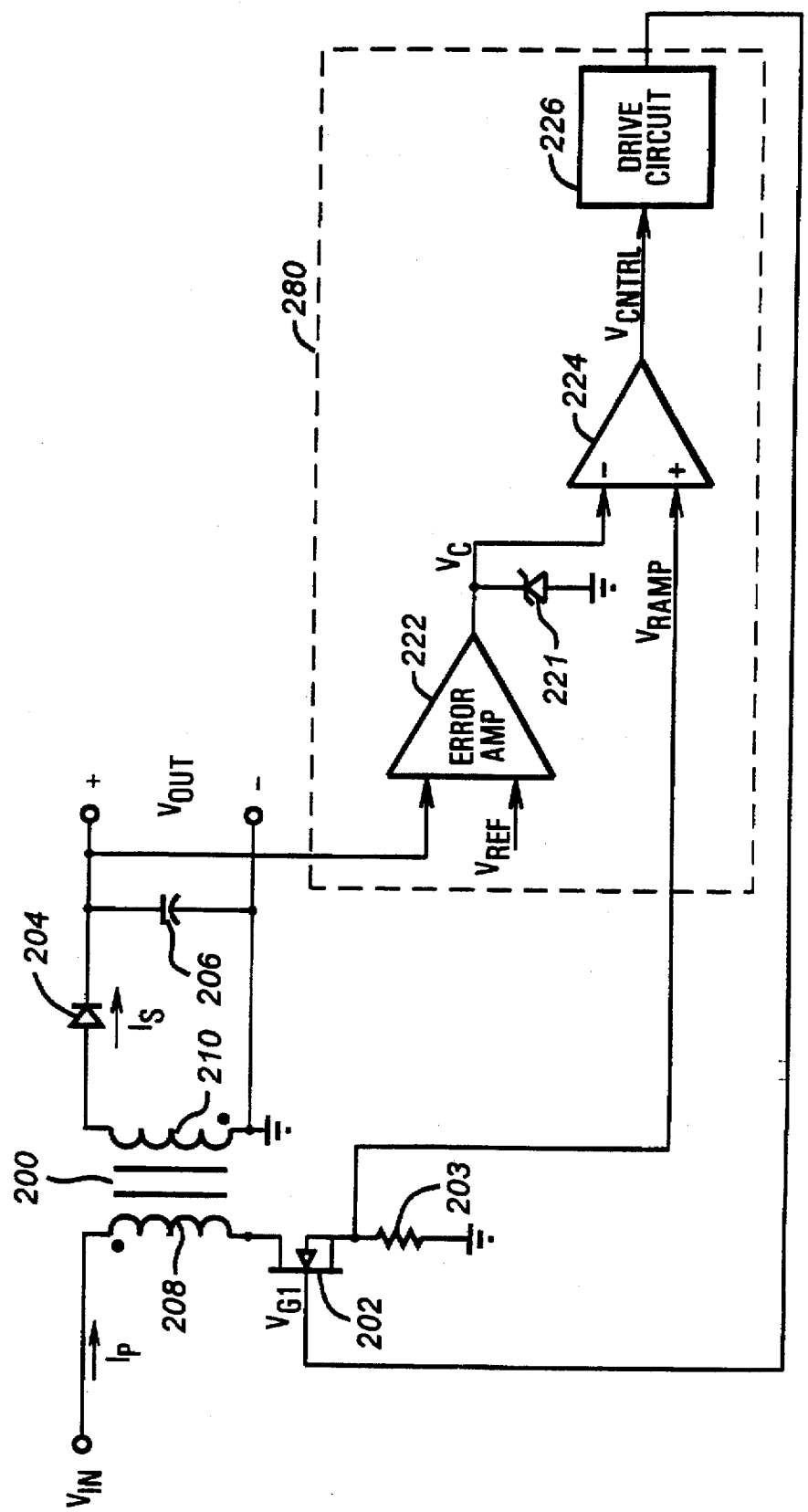
FIG. 2 illustrates a more detailed schematic diagram of the control system of FIG. 1.
Figure 3A:
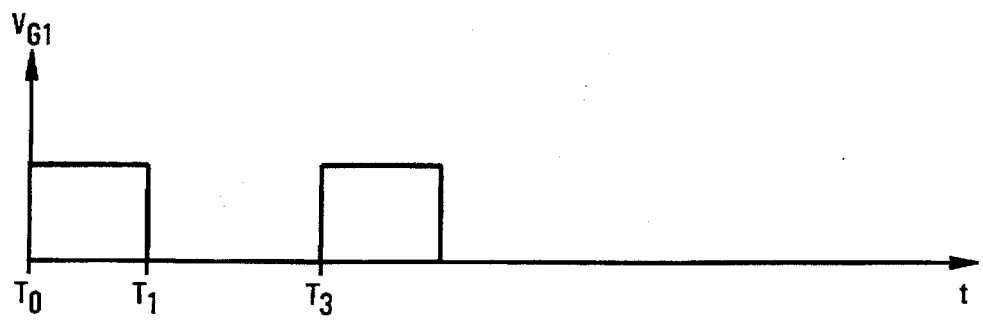
FIGS. 3A, 3B, 3C, and 3D illustrates the waveforms present in the circuits of FIGS. 1 and 2.
Figure 3B:
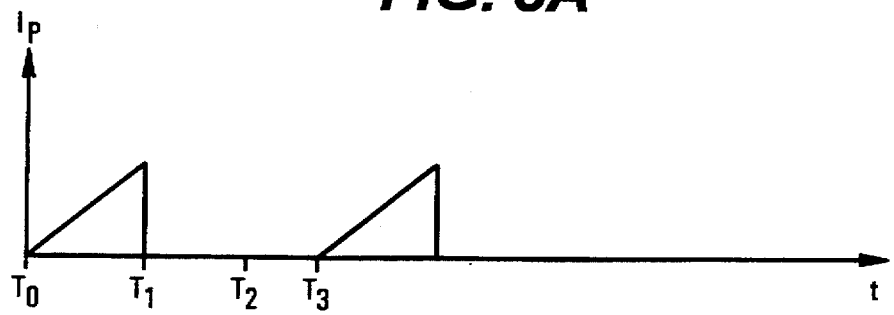
Figure 3C:
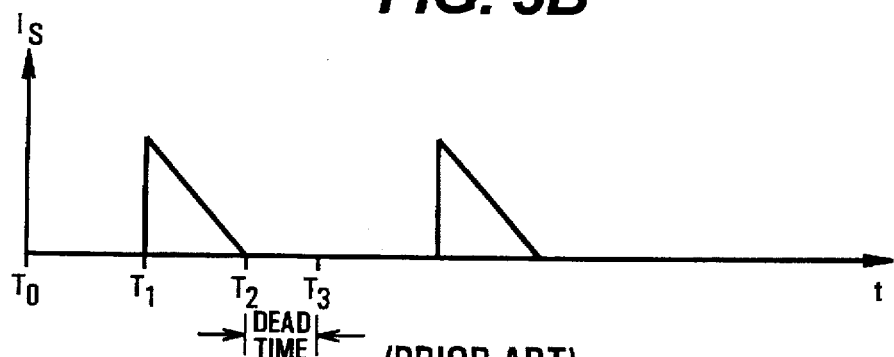
Figure 3D:
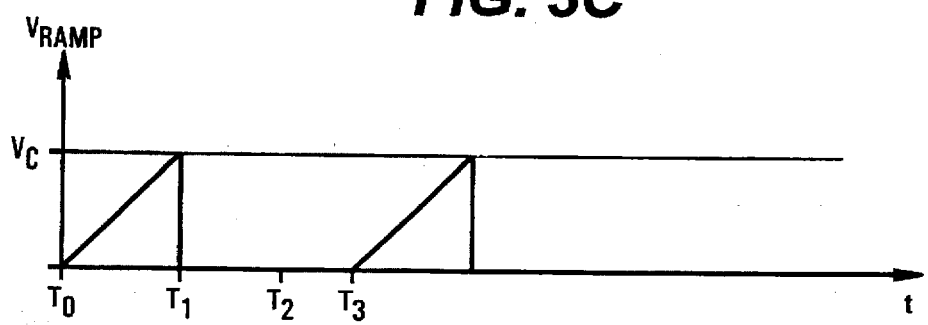

Now discussing control circuit 280 (FIG. 2) in greater detail and the current-mode control it provides, an error amplifier 222 has as its inputs the converter output voltage $V_{OUT}$ and a voltage reference signal $V_{REF}$. From the comparison of these two input signals, the error amplifier 222 generates the control signal $V_c$. Although not shown in FIG. 2, it has been conventional to include a frequency compensation network for the error amplifier 222. The design features of such a network are well-known to those skilled in the art.

The control circuit 280 uses the control voltage $V_c$ provided by the amplifier 222 to directly control the peak magnitude of the primary current $I_{P\_PK}$, which in turn controls the output power $P_{300}$. The control voltage $V_c$ is provided to the inverting input of a comparator 224 which has its non-inverting input connected to $V_{RAMP}$. The comparator 224 furnishes an output signal $V_{CNTRL}$ to a conventional drive circuit 226 which generates $V_{G1}$. The design of the drive circuit 226 is well-known to those skilled in the art. The drive circuit 226 negates $V_{G1}$ when $V_{CNTRL}$ is momentarily asserted, and the drive circuit 226 subsequently asserts the $V_{G1}$ signal to begin another power cycle of the constant frequency converter 300.

Other embodiments for control circuit 280 are possible. For example, control circuit 280 can regulate the average value of $I_p$, otherwise known as tolerance band control; or control circuit 280 can provide a constant switching frequency and turn on transistor 202 at the beginning of each switching cycle, where the conduction time of transistor 202 is governed by the peak magnitude of $I_p$. All of these current-mode control techniques utilize $V_{OUT}$ and $V_{RAMP}$.

Beginning at time $T_0$, $I_p$ increases in a linear fashion until time $T_1$ when $V_{RAMP}$ is equal to $V_c$. At time $T_1$, when the voltage level $V_{RAMP}$ reaches the voltage level of the $V_c$ signal, the comparator 224 undergoes a low-to-high transition which triggers drive circuit 226 to turn off transistor 202 by negating $V_{G1}$. Thus, as shown in FIG. 3A, 3B, 3C, and 3D, the time interval from time $T_0$ to time $T_1$ is the time during which transistor 202 conducts. The time interval from time $T_1$ to time $T_2$ is the time during which transistor 202 does not conduct.

A Zener diode 221 limits the maximum voltage level of the $V_c$ signal. The diode 221 has its cathode coupled to the output of the amplifier 222 and its anode coupled to ground.

Figure 4A:
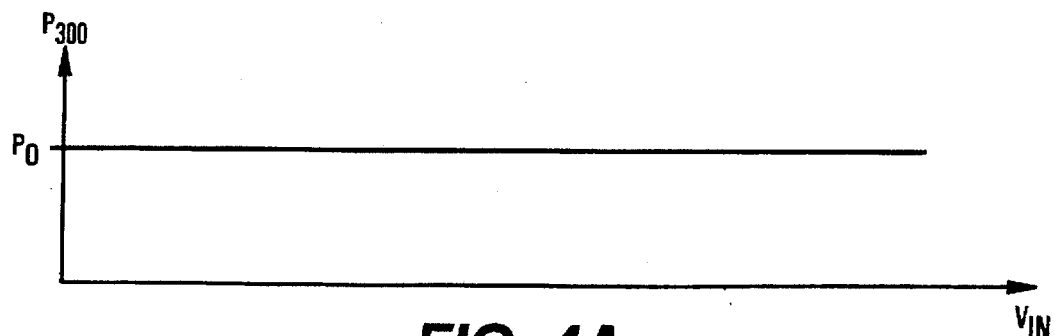
FIGS. 4A–D illustrate the linear compensation of the peak magnitude of the primary current by control systems of the prior art.
Figure 4B:
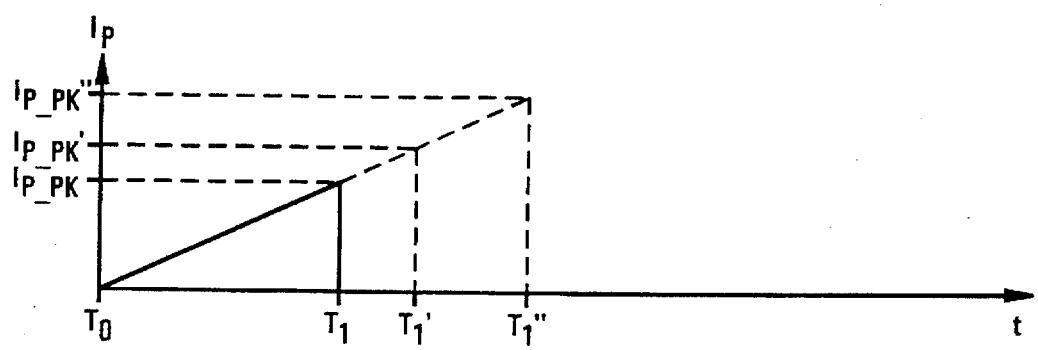
Figure 4C:
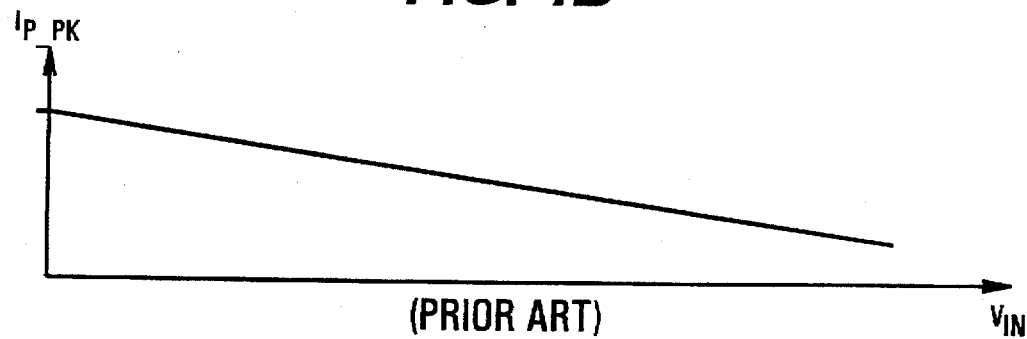
Figure 4D:
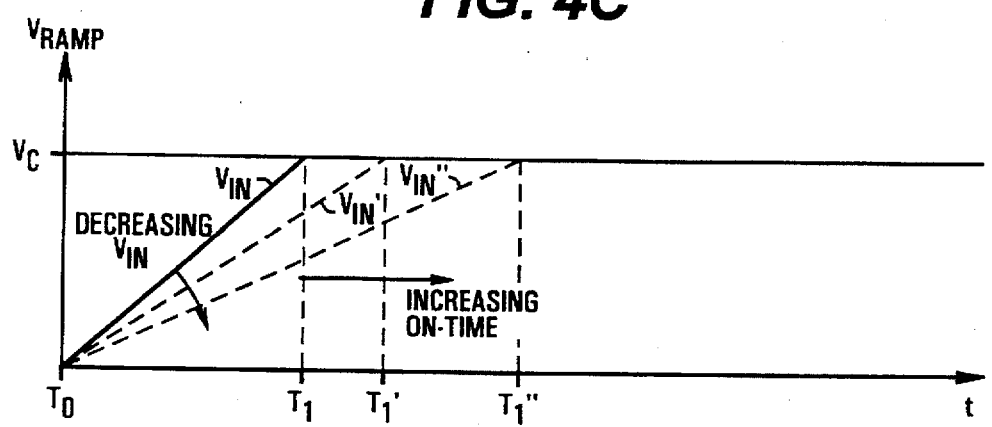

Referring to FIGS. 4A–C, the control circuit 280 provides two types of control. First, the control signal $V_c$ is self-adjusting so that the control circuit 280 achieves the desired output power $P_{300}$. At this desired output power $P_{300}$, the peak magnitude of the primary current $I_{P\_PK}$ remains constant for a constant $V_{IN}$. The control circuit 280 also compensates for variations in the output power $P_{300}$ with the input voltage $V_{IN}$ which are attributable to parasitic elements in the converter 300. The rate of increase of the input voltage $V_{IN}$ varies inversely to the rate of increase of the $V_{RAMP}$ signal which maintains the output $P_{300}$ at a constant level. For example, for a certain input voltage $V_{IN}$, the transistor 202 conducts from time $T_0$ to time $T_1$. The primary current $I_p$ has a peak magnitude $I_{P\_PK}$ at time $T_1$. If the input voltage changes to $V_{IN}$, the level of the $V_{RAMP}$ voltage does not reach the level of the control voltage $V_c$ until time $T_1$. When this occurs, the primary current $I_p$ has a new peak magnitude of $I_{P\_PK}$. The increased peak magnitude of the primary current $I_p$ sustains the output power $P_{300}$ at the desired output power $P_0$.

2. The Present Invention

Figure 5:
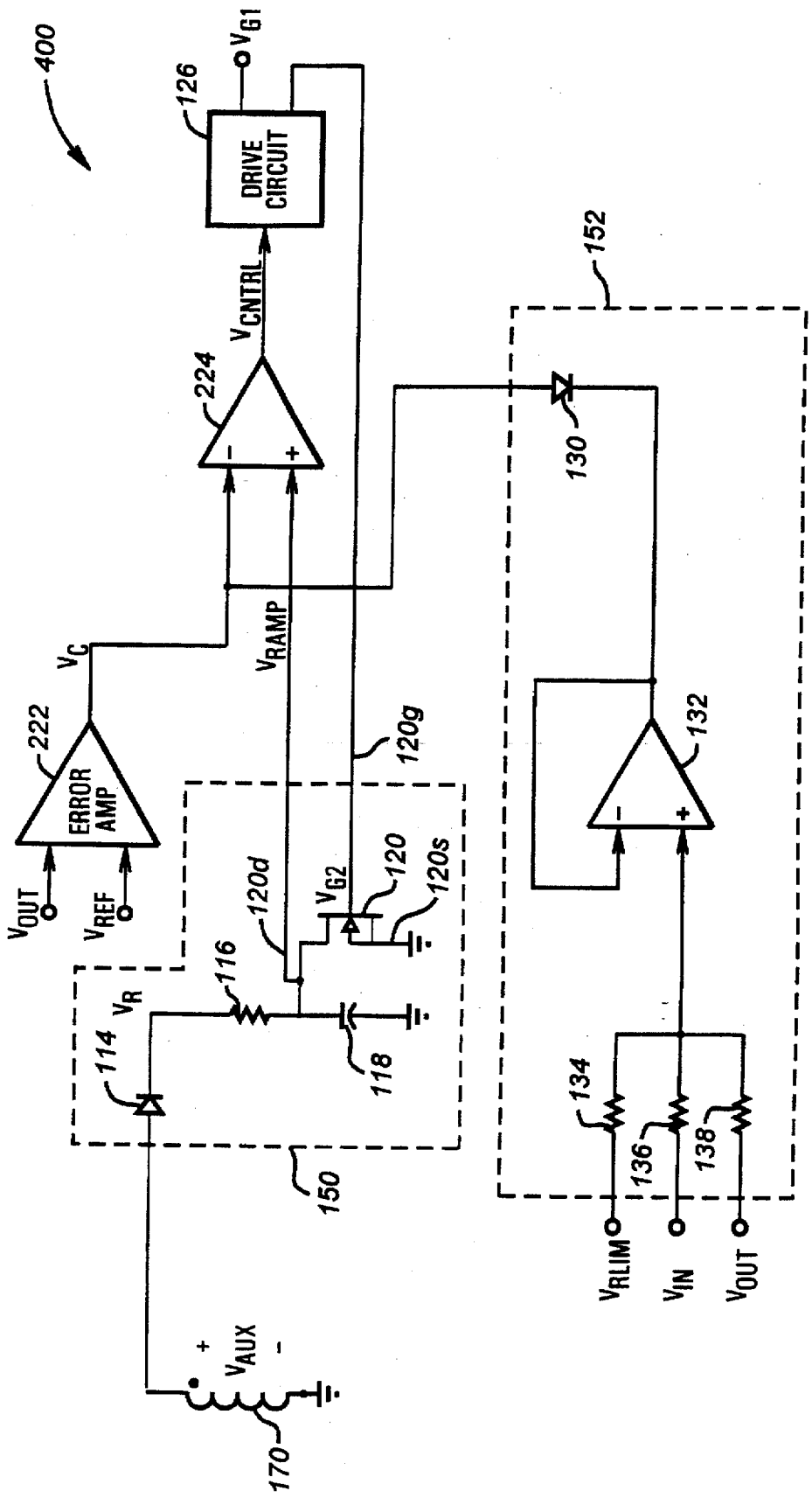
FIG. 5 is a schematic diagram illustrating the preferred embodiment of the present invention.
Figure 6A:
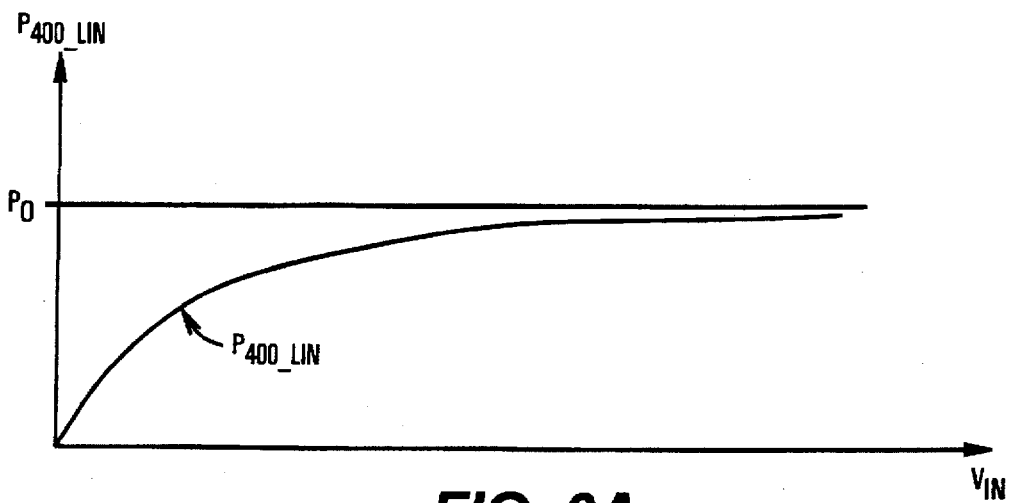
FIGS. 6A, 6B, 6C, and 6D illustrates the output power characteristics of a critically discontinuous flyback converters.
Figure 6B:
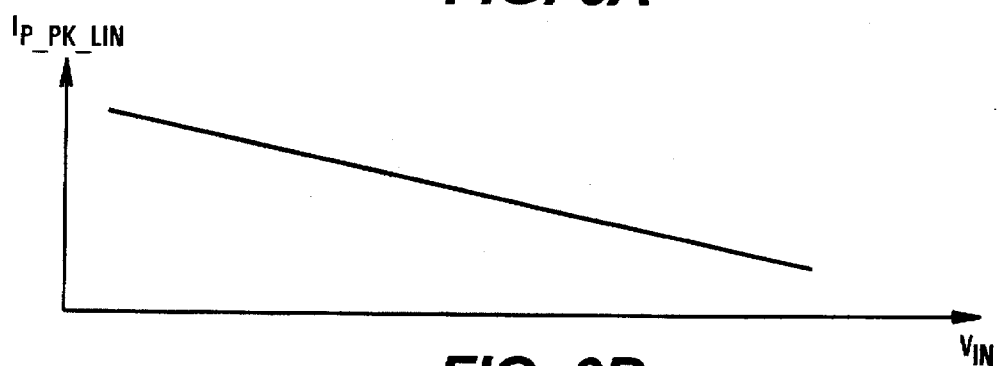
Figure 6C:
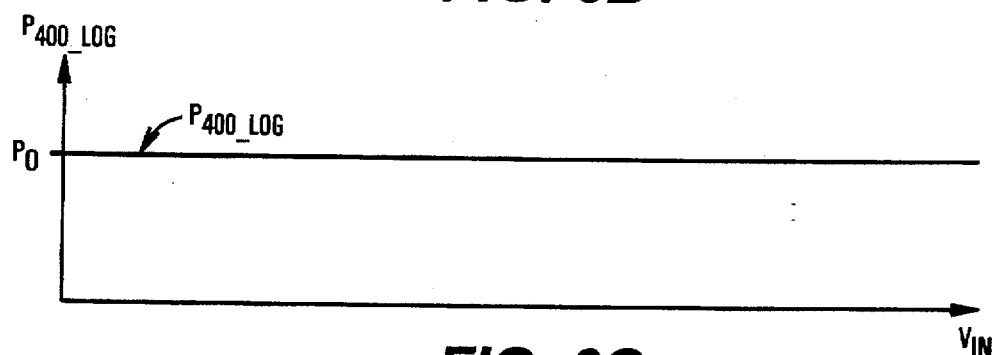
Figure 6D:
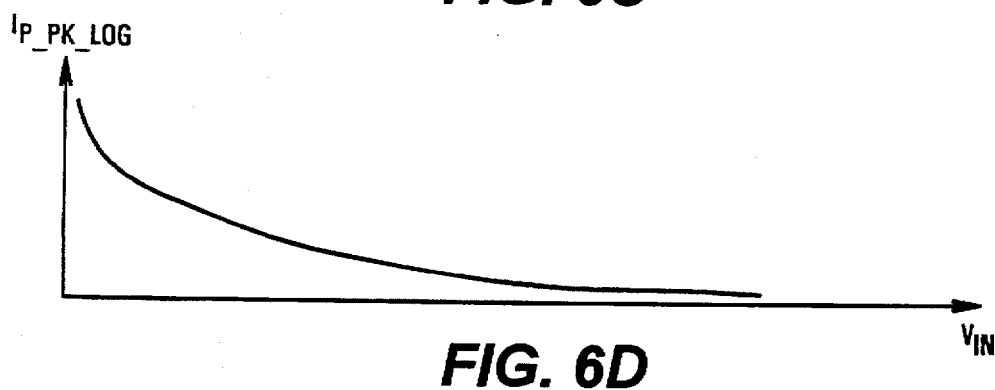
Figure 7A:
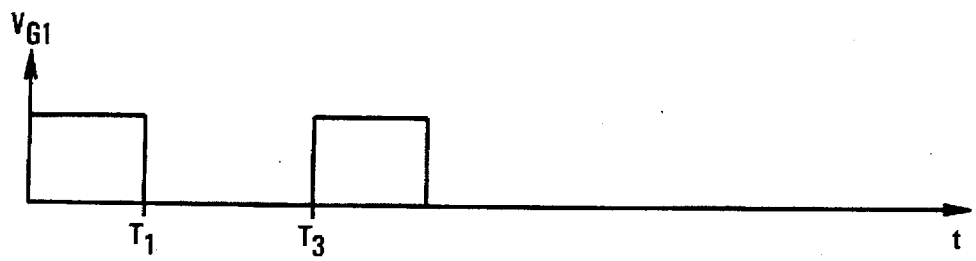
FIGS. 7A, 7B, 7C, 7D, 7E, and 7F illustrates the waveforms for logarithmic compensation furnished by the present invention.
Figure 7B:
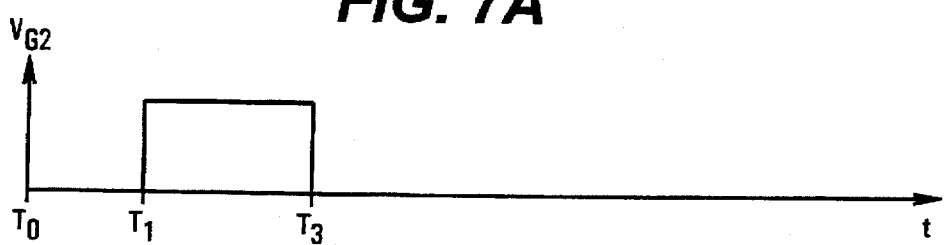
Figure 7C:
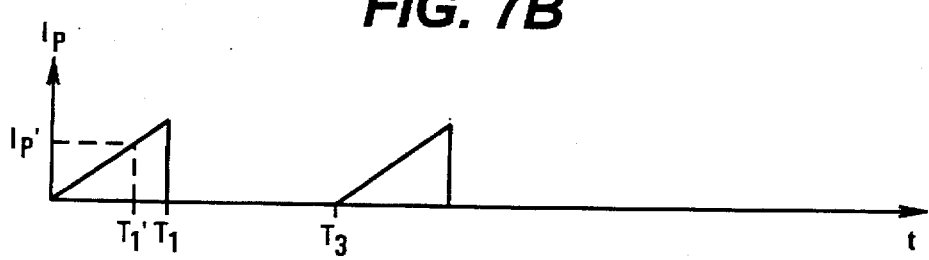
Figure 7D:
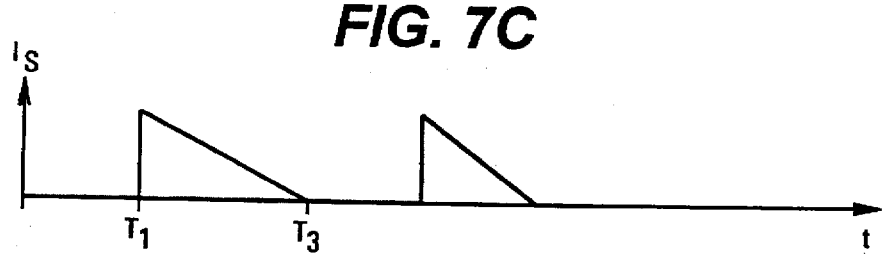
Figure 7E:
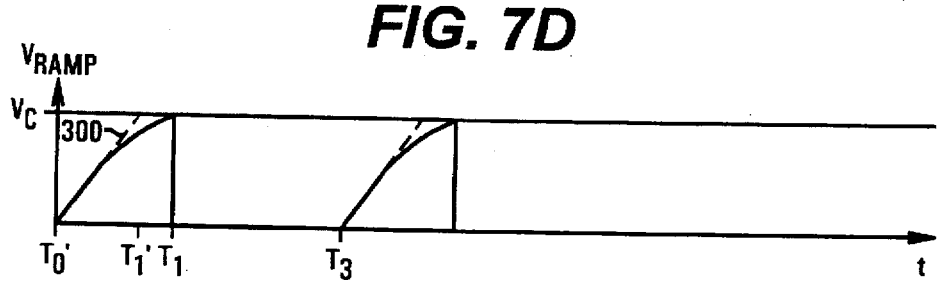
Figure 7F:
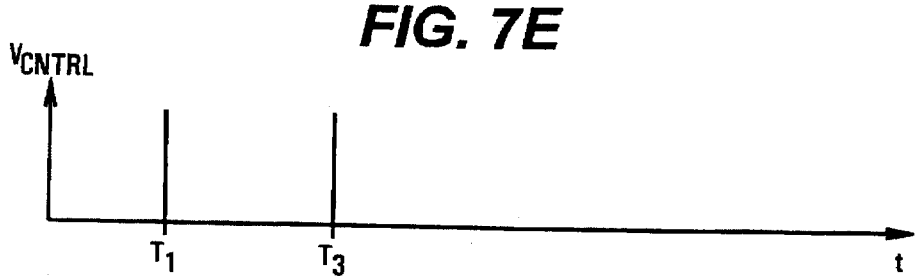

The present invention relates to the control of a critically discontinuous, variable frequency flyback converter 400 (FIG. 5). As previously described, no "dead time" exists when the converter 400 is operated in this mode; therefore, energy is always being transferred, and the converter 400 is inherently more efficient.

An output power $P_{400}$ of the converter 400 does not vary linearly with the peak magnitude $I_{P\_PK}$ of the primary current $I_p$ and the input voltage $V_{IN}$. However, it has been discovered that if the peak magnitude $I_{P\_PK}$ of the primary current $I_p$ is logarithmically compensated for changes in the input voltage $V_{IN}$, a desired constant output power $P_0$ can be maintained over a wide range of input voltages $V_{IN}$.

Shown in FIG. 6 is an output power versus input voltage $V_{IN}$ characteristic of the variable frequency, critically discontinuous converter 400 for two different types of control systems for regulating the output power $P_{400}$.

The first type of control is the previously described linear compensation of a peak magnitude $I_{P\_PK\_LIN}$ of the primary current $I_p$ for changes in the input voltage $V_{IN}$. As shown in FIGS. 6A, 6B, 6C, and 6D for this linear compensation, an output power $P_{400\_LIN}$ falls below a desired output power $P_o$ as the input voltage $V_{IN}$ decreases.

The present invention logarithmically compensates a peak magnitude $I_{P\_PK\_LOG}$ of the primary current $I_p$ for changes in the input voltage $V_{IN}$. This sustains an output power $P_{400\_LOG}$ at the desired output power $P_0$.

Shown in FIG. 5 is a detailed schematic diagram of the flyback converter 400 of the preferred embodiment of the present invention. In the flyback converter 400, a ramp generator 150 and an auxiliary winding 170 of the transformer 200 are used to produce the $V_{RAMP}$ signal. Also, a drive circuit 126 whose operation is discussed below is used in place of the drive circuit 226. Additionally, the flyback converter 400 includes a clamping circuit 156 to limit the maximum magnitude of $V_c$ in place of the diode 221. The ramp generator 150 (FIGS. 6A, 6B, 6C, and 6D) is connected to receive the voltage $V_{AUX}$ from the auxiliary winding 170. A diode 114 has its anode connected to one end of the auxiliary winding 170 and its cathode connected to one end of a resistor 116. The other end of the resistor 116 is connected to one end of a capacitor 118, and the other end of the capacitor 118 is connected to secondary side ground. In conjunction with the polarity of the winding 212, the diode 114 provides that the auxiliary voltage $V_{AUX}$ will be sampled during time the transistor 202 is conducting.

When the transistor 202 is conducting, the $V_{AUX}$ voltage provides a signal that varies proportionately with $V_{IN}$. Other embodiments are envisioned in which the secondary current $I_s$ is sampled, where the polarity of auxiliary winding 212 and diode 114 are configured to sample $I_s$ during the time during which transistor 202 does not conduct. The $V_{RAMP}$ signal is provided at the connection of capacitor 118 and resistor 116. The $V_{RAMP}$ signal increases in time at an exponential rate governed by a time constant established by the resistance of resistor 116 and the capacitance of capacitor 118. This time constant also establishes the rate the peak magnitude $I_{P\_PK\_LOG}$ logarithmically increases with a corresponding increase in the input voltage $V_{IN}$. The value of resistance for the resistor 116 and the value of capacitance for the capacitor 118 are chosen to furnish the desired constant output power $P_0$ over a wide range of the input voltage $V_{IN}$. An N-channel, enhancement mode, metal-oxide-semiconductor field-effect-transistor (MOSFET), transistor 120, is provided to initialize ramp generator 150, during the time which transistor 202 does not conduct. Transistor 120 has a drain and a source terminal 120s coupled in parallel with capacitor 118. The gate terminal 120g of transistor 120 is connected to a control signal $V_{G2}$ which turns on transistor 120 during the time during which transistor 202 does not conduct. A sample waveform of $V_{G2}$ is shown in FIGS. 7A, 7B, 7C, 7D, 7E and 7F. When the transistor 120 conducts, the capacitor 118 is discharged so that the $V_{RAMP}$ signal can once again linearly increase from zero when transistor 202 conducts. $V_{G2}$ is generated by drive circuit 126, the design of which is like the drive circuit 226, well-known to those skilled in the art.

Also shown in FIG. 5 is a schematic diagram illustrating a clamping circuit 152 used to clamp the peak magnitude of $V_c$ as a function of $V_{RLIM}$, a ramp limit voltage; $V_{IN}$ and $V_{OUT}$. The ramp limit voltage governs the maximum control voltage $V_c$. The input voltage $V_{IN}$ and the output voltage $V_{OUT}$ signals are also received by the clamping circuit 152 and used to adjust for additionally parasitic non-linearities in the converter 400.

As shown in FIG. 5, the inverting input of the amplifier 224 is connected to the anode of a diode 130. The cathode of the diode 130 is connected to the output of the amplifier 132. Amplifier 132 functions as a summing voltage buffer, having its inverting input connected to its output.

The non-inverting input of amplifier 132 is connected to a summing network which has as its inputs, $V_{RLIM}$, $V_{IN}$ and $V_{OUT}$. A resistor 134 is connected between $V_{RLIM}$ and the non-inverting input of amplifier 232. A resistor 136 is connected between $V_{IN}$ and the non-inverting input of amplifier 132. A resistor 138 is connected between $V_{OUT}$ and the non-inverting input of amplifier 132.

FIGS. 7A, 7B, 7C, 7D, 7E, and 7F illustrates the logarithmic compensation provided by the present invention. As shown in FIGS. 7A, 7B, 7C, 7D, 7E, and 7F at time $T_1$, for $V_{IN}$ less than $V_2$, $V_{RAMP}$ initially increases in a linear fashion as indicated by a shape 300, representative of an ideal linear ramp voltage. However, because of the time constant established by resistor 116 and capacitor 118, the magnitude of the $V_{RAMP}$ signal does not conform to the magnitude of an ideal ramp voltage. This extends the conduction time of transistor 202 to time $T_1$ instead of time $T_1'$ which would occur for an ideal linear ramp voltage. Thus, the time interval during which transistor 202 conducts is from time $T_0$ to time $T_1$ instead of from time $T_0$ to time $T_1'$. This allows a larger peak magnitude for $I_p$, and converter 400 can maintain the desired output power $P_o$.

Now discussing the operation of the remaining circuitry of ramp generator 150, from time $T_0$ to time $T_1$, the $V_{G2}$ signal is negated and transistor 120 does not conduct. This allows the capacitor 118 to charge. However, at time $T_1$, the $V_{G2}$ signal is asserted which in turn allows the capacitor 118 to discharge. The $V_{G2}$ signal is asserted during the time during which the transistor 202 does not conduct in order to discharge the capacitor 118. This occurs in order that the $V_{RAMP}$ signal can once again ramp upward when the $V_{G1}$ signal is asserted high at time $T_3$.

In summary, the present invention relates to a logarithmically compensated ramp generator 150 of flyback converter 400 which furnishes the $V_{RAMP}$ signal. The time constant, as established by the resistor 116 and the capacitor 118 ensures that the peak magnitude $I_{P\_PK}$ of the primary current $I_p$ increases at an appropriate logarithmic rate to compensate the input voltage $V_{IN}$.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A control system for regulating a critically discontinuous switching power supply, the power supply including an inductive element and a switch having a series switched path for controlling a current through the inductive element, the switch having a control terminal for activating the series switch path, the control system comprising:

a voltage sensor coupled to said inductive element and providing a first signal indicative of the voltage across the inductive element;

a ramp generator circuit for receiving the first signal and providing a second signal indicative of the current in the inductive element, wherein said ramp generator circuit adjusts the second signal to compensate for variations of the power curve of the power supply due to said voltage across the inductive element; and a control circuit for receiving the second signal and an output voltage of the power supply and providing a control signal to the switch, the control signal provided to control the current in the inductive element in order to achieve a desired direct current output voltage.

2. The control system of claim 1, wherein the switching power supply is a flyback converter.

3. The control system of claim 1, wherein said voltage sensor is inductively coupled to the inductive element.

4. The control system of claim 2, wherein said voltage sensor is inductively coupled to the inductive element.

5. The control system of claim 2, wherein said voltage sensor provides an indication of the voltage across the inductive element when the switch is conducting.

6. The control system of claim 1, wherein said ramp generator circuit adjusts the second signal for nonlinear regions of the power curve of the power supply.

7. The control system of claim 1, wherein said ramp generator circuit adjusts the second signal whenever the input voltage of the power supply is below an input voltage threshold.

8. The control system of claim 1, wherein the adjustment of the second signal by said ramp generator circuit uses a logarithmic compensation technique.

9. The control system of claim 1, wherein the adjustment of the second signal by said ramp generator circuit uses a logarithmic compensation technique whenever the input voltage of the power supply falls below an input voltage threshold.

10. The control system of claim 1, wherein said ramp generator circuit includes the following:

a resistor coupled between the first signal and the second signal; and a capacitor coupled between the second signal and ground.

11. The control system of claim 1, wherein said control circuit provides variable frequency current-mode control for the power supply.

12. The control system of claim 11, wherein said control circuit provides tolerance-band current mode control for the power supply.

13. The control system of claim 11, wherein said control circuit provides constant off-time current-mode control for the power supply.

14. The control system of claim 1, wherein said control circuit provides constant frequency current-mode control for the power supply.

15. The control system of claim 1, wherein the power supply operates in a discontinuous mode.

* * * * *